June 18, 1940.　　　　E. F. WESSON　　　　2,205,279
ILLUMINATED MIRROR
Filed Oct. 5, 1938　　　　2 Sheets-Sheet 1

Inventor
Earl F. Wesson
By L. B. James
Attorney

June 18, 1940.    E. F. WESSON    2,205,279
ILLUMINATED MIRROR
Filed Oct. 5, 1938    2 Sheets-Sheet 2

Inventor
Earl F. Wesson
By L. B. James
Attorney

Patented June 18, 1940

2,205,279

UNITED STATES PATENT OFFICE 2,205,279

ILLUMINATED MIRROR

Earl F. Wesson, Tucson, Ariz.

Application October 5, 1938, Serial No. 233,438

2 Claims. (Cl. 240—4.2)

This invention relates to a mirror and lamp carrying attachment for the sun visor of an automobile, the general object of the invention being to provide a reflector plate having a mirror attached to a part of the same, lamps attached to other parts and clamps for attaching the plate to the visor, so that when the visor is swung downwardly, the mirror can be used and by turning on the current to the lamps the parts will be illuminated.

The invention also consists in certain other features of construction, combination and arrangement of the several parts, to be hereinafter fully described, illustrated in the accompanying drawings and specifically pointed out in the appended claims.

In describing the invention in detail reference will be had to the accompanying drawings wherein like characters denote like or corresponding parts throughout the several views, and in which.

Figure 1:
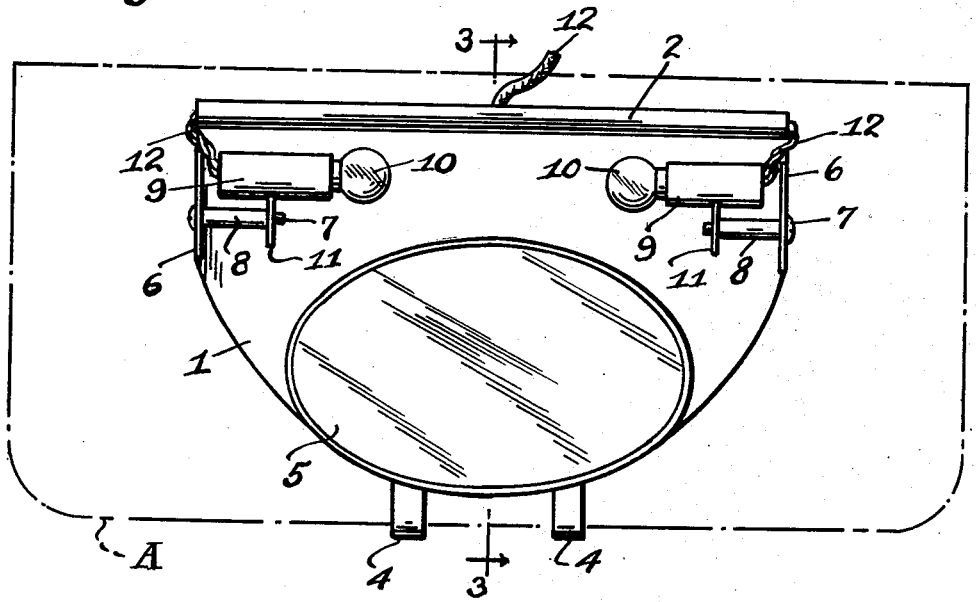
Fig. 1 is a front view of the device showing the visor in dotted lines.
Figure 2:
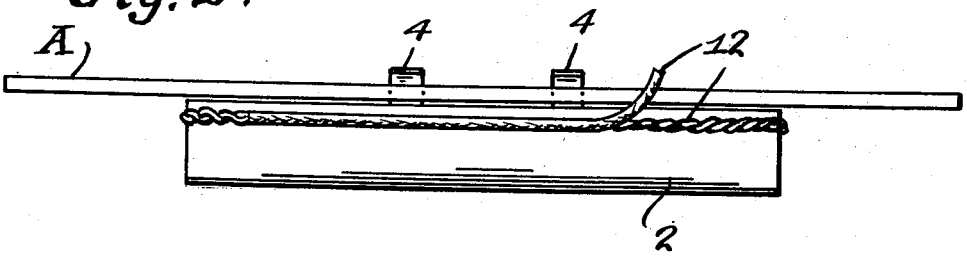
Fig. 2 is a top plan view showing the device attached to the visor.
Figure 7:
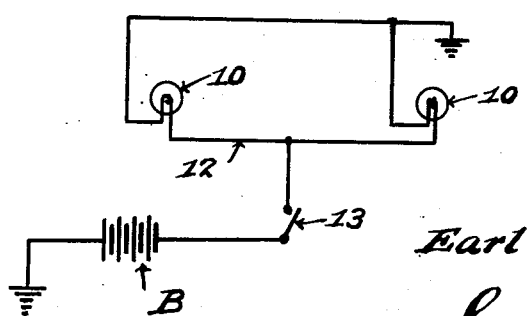
Fig. 7 is a view of the circuits.
Figure 3:
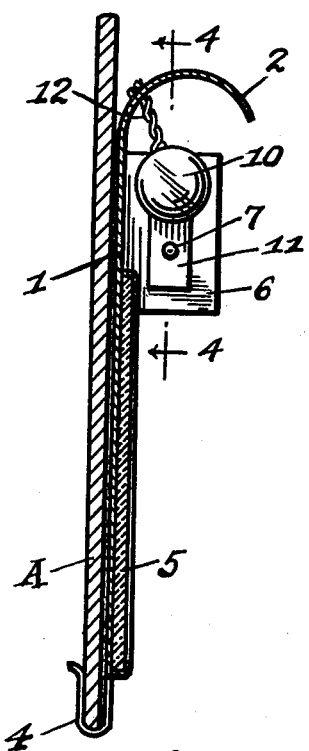
Fig. 3 is a section on line 3—3 of Fig. 1.
Figure 4:
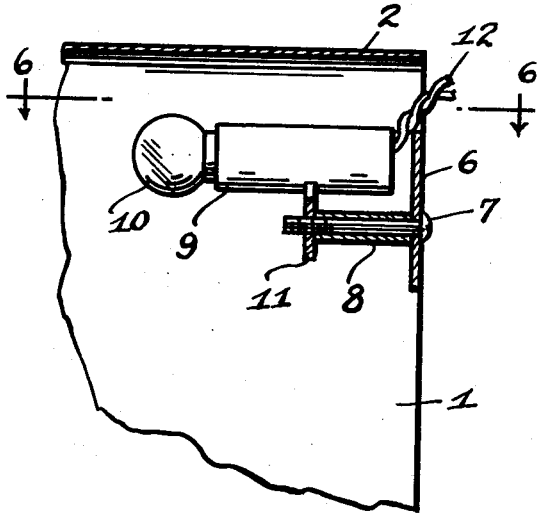
Fig. 4 is a section on line 4—4 of Fig. 3.
Figure 5:
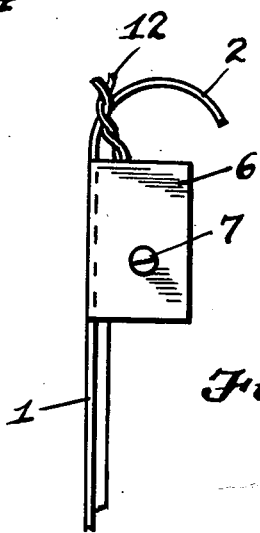
Fig. 5 is an edge view of the upper part of the device.
Figure 6:
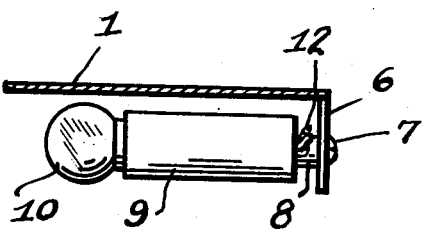
Fig. 6 is a section on line 6—6 of Fig. 4.

In these drawings, the numeral 1 indicates a plate, preferably of the shape shown, with its straight upper edge curved over to provide a reflector part 2 for directing rays of light downwardly and forwardly. Substantially U shaped clamps 4 are connected to the lower part of the plate and are adapted to engage the lower edge of a sun visor A, to hold the device to the visor. A mirror 5, preferably of oval shape, has its frame welded, or otherwise attached to the lower part of the plate, the parts of the plate not covered by the mirror being made reflective. At each side of the plate, adjacent the top thereof, outwardly extending parts 6 are formed with or connected to the plate, and a bolt 7 passes through each part 6. A cylinder or spacer 8 is placed on each bolt but exposes the inner threaded end of the bolt. A socket 9 for an electric bulb 10 is located in each upper corner of the plate and each socket has a depending plate like part 11 attached thereto, which has a threaded hole therein for receiving the inner end of a bolt 7. These sockets are connected with the battery B by the conductors 12, and a switch 13 controls the circuits to the lamps.

Thus the device can be readily attached to the sun visor of an automobile and by swinging the visor downwardly, the mirror can be used and by closing the switch the lamps will be lighted to illuminate the face of the user.

It is thought from the foregoing description that the advantages and novel features of the invention will be readily apparent.

It is to be understood that changes may be made in the construction, combination and arrangement of the several parts, provided such changes fall within the scope of the appended claims.

What I claim and desire to protect by Letters Patent is:

1. An attachment for a sun visor of a vehicle comprising a plate, means for detachably mounting said plate against the rear surface of a visor, a mirror carried by said plate and covering the lower portion thereof, portions of the plate above said mirror being exposed and constituting a reflecting surface, the upper end portion of said plate being curved outwardly and downwardly and constituting a reflector, ears extending outwardly from opposite side edges of said plate below said reflector, horizontal bolts carried by said ears and extending inwardly therefrom in spaced and overlying relation to said plate, sockets extending horizontally under said reflector and provided with mounting arms having threaded openings receiving threaded inner end portions of said bolts, spacing sleeves fitting about said bolts between said ears and the arms of said sockets, and bulbs carried by said sockets and projecting from inner ends thereof between the mirror and the reflector.

2. An attachment for a sun visor of a vehicle comprising a backing plate having mounting means, a mirror mounted in covering relation to the lower portion of said plate, portions of the plate above said mirror being exposed, the upper end of said plate being bent to form an overhanging reflector, ears extending from opposite side edges of said plate below said reflector, sockets extending horizontally in front of the exposed upper portion of said plate, mounting members extending inwardly from said ears and detachably supporting said sockets between said mirror and end portions of said reflector, and bulbs carried by and extending from inner ends of said sockets.

EARL F. WESSON.